United States Patent [19]

Farber et al.

[11] Patent Number: 5,316,791
[45] Date of Patent: May 31, 1994

[54] PROCESS FOR IMPROVING IMPACT RESISTANCE OF COATED PLASTIC SUBSTRATES

[75] Inventors: Bruce M. Farber, La Mirada; William C. Harbison, Mission Viejo, both of Calif.

[73] Assignee: SDC Coatings Inc., Anaheim, Calif.

[21] Appl. No.: 6,633

[22] Filed: Jan. 21, 1993

[51] Int. Cl.$^5$ .............................................. B05D 5/06
[52] U.S. Cl. ................................... 427/464; 427/379; 427/393.5; 427/412.1
[58] Field of Search ............... 427/162, 164, 393.5, 427/412.1, 379

[56] References Cited

U.S. PATENT DOCUMENTS

| | | | |
|---|---|---|---|
| 3,986,997 | 10/1976 | Clark | 260/29.2 |
| 4,027,073 | 5/1977 | Clark | 428/412 |
| 4,082,894 | 4/1978 | Yoshida | 427/164 |
| 4,177,175 | 12/1979 | Baney et al. | 260/29.2 |
| 4,177,315 | 12/1979 | Ubersax | 428/336 |
| 4,188,451 | 2/1980 | Humphrey, Jr. | 428/381 |
| 4,207,357 | 6/1980 | Goosens | 427/162 |
| 4,218,508 | 8/1980 | Humphrey, Jr. | 428/331 |
| 4,242,381 | 12/1980 | Goosens et al. | 427/387 |
| 4,242,383 | 12/1980 | Goosens et al. | 427/387 |
| 4,242,416 | 12/1980 | Baney et al. | 428/412 |
| 4,275,118 | 6/1981 | Baney et al. | 428/412 |
| 4,348,462 | 9/1982 | Chung | 428/412 |
| 4,355,135 | 10/1982 | January | 524/767 |
| 4,390,373 | 6/1983 | White et al. | 106/287.12 |
| 4,442,168 | 4/1984 | White et al. | 428/331 |
| 4,478,876 | 10/1984 | Chung | 427/54.1 |
| 4,486,504 | 12/1984 | Chung | 428/412 |
| 4,499,217 | 2/1985 | Yoshimura et al. | 523/456 |
| 4,500,669 | 2/1985 | Ashlock et al. | 524/440 |
| 4,540,634 | 9/1985 | Ashlock et al. | 428/541 |
| 4,571,365 | 2/1986 | Ashlock et al. | 428/412 |
| 4,702,773 | 10/1987 | Ashlock et al. | 106/287.12 |
| 4,753,827 | 11/1990 | Yoldas | 522/84 |
| 4,973,612 | 5/1991 | Cottington et al. | 428/436 |
| 5,013,608 | 5/1991 | Guest et al. | 428/436 |
| 5,075,348 | 12/1991 | Revis et al. | 522/84 |
| 5,102,695 | 4/1992 | Guest et al. | 427/164 |
| 5,104,929 | 4/1992 | Bilkadi | 524/847 |
| 5,114,783 | 5/1992 | Hodnett, III | 428/417 |
| 5,126,394 | 6/1992 | Revis et al. | 524/548 |

FOREIGN PATENT DOCUMENTS 0404111 12/1990 European Pat. Off. .

OTHER PUBLICATIONS

J. W. Rosthauser and K. Nachtkamp, *Waterborne Polyurethanes*, Mobay Corporation (1987).

Witcobond W-240, Bulletin 340, Organics Division, Witco Corporation, Apr. 1986.

NeoRez R-9637, A High Solids Waterborne Urethane for Air Dry Coatings, Bulletin R-9637A, ICI Resins U.S. (date unavailable).

*Primary Examiner*—Janyce Bell
*Attorney, Agent, or Firm*—Pretty, Schroeder, Brueggemann & Clark

[57] ABSTRACT

A process for improving the impact resistance of a coated plastic substrate, particularly those polymers having a high refractive index, comprising applying an aqueous polyurethane dispersion as a primer layer to at least one surface of the plastic substrate, at least partially curing the aqueous polyurethane dispersion by air drying at ambient temperature, applying a coating composition over the polyurethane primer layer, and curing the coating composition to form an abrasion resistant hard coat. Preferably, the aqueous polyurethane dispersion is air dried at ambient temperature for less than one hour before application of the abrasion resistant coating composition. The process provides an impact enhancing, abrasion resistant coating system having strong interfacial adhesion that is preferably transparent for application onto preferably transparent plastic articles, such as ophthalmic lenses and safety eye wear.

25 Claims, No Drawings

PROCESS FOR IMPROVING IMPACT RESISTANCE OF COATED PLASTIC SUBSTRATES

BACKGROUND OF THE INVENTION

1. Field of the Invention

The present invention relates to a process for improving the impact resistance of plastic substrates, such as those used as ophthalmic lenses, by applying to at least one surface of the plastic substrate a primer layer consisting of an aqueous thermosetting polyurethane dispersion which can be cured by air drying at ambient temperature before another layer is applied over it.

2. Description of Related Art

Clear, transparent plastic materials are widely used as substitutes for glass in many applications in view of their unique properties, such as lighter weight, ease of handling, and ease of formation of articles. Plastic materials are not without shortcomings, however, as most plastics are soft and scratch quite readily. Consequently, it has become customary to coat plastic materials with organic or siloxane coating compositions to provide an abrasion resistant "hard coat" before using them in certain applications. Preferably, such hard coats are clear, unpigmented coatings. Exemplary organic coatings include heat curable epoxy and polyurethane resins and ultraviolet light curable acrylic resins. Although such organic coatings tend to be less expensive than siloxane coatings, their abrasion resistance generally is not as good.

Many siloxane coating compositions are known which, when applied to a substrate and cured, provide a highly abrasion resistant coating on the surface of the plastic substrate. Foremost among these are the coating compositions described in U.S. Pat. Nos. 3,986,997 and 4,027,073 to Clark, Nos. 4,177,175, 4,242,416, and 4,245,118 to Baney et al., No. 4,177,315 to Ubersax, Nos. 4,188,451 and 4,218,508 to Humphrey, Nos. 4,207,357, 4,242,381, and 4,242,383 to Goosens, No. 4,355,135 to January, Nos. 4,390,373 and 4,442,168 to White et al., Nos. 4,500,669, 4,540,634, 4,571,365 and 4,702,773 to Ashlock et al., No. 4,753,827 to Yoldas, and Nos. 5,013,608 and 5,102,695 to Guest et al. The hard coats described in these patents have been widely used to impart abrasion resistance to plastic lenses, including those used in eye glasses and safety goggles, windows in buildings and motor vehicles, plastic panels, and other articles where an abrasion resistant or scratch resistant surface coating is of importance. However, such abrasion resistant hard coats are also known to reduce the impact resistance of a plastic substrate in certain applications.

In recent years, plastic materials with increasingly higher refractive indexes have been used to make ophthalmic lenses. As their refractive index increases, the thickness of the lens required to achieve the same level of correction decreases. The resulting lens is thinner and lighter and, therefore, more attractive to the user. These higher refractive index plastic materials, however, still tend to be relatively soft and scratch more easily than glass. Known organic or siloxane coating compositions can be applied to these plastic materials to provide a protective abrasion resistant coating. However, when such a hard coat is applied to these higher refractive index plastic materials, their impact resistance tends to decrease in comparison to the uncoated plastic material. This is a serious disadvantage, particularly since the decrease may be large enough to reduce the impact resistance below minimum government standards. Moreover, application of additional coating layers, such as anti-reflective coatings, to these coated plastic materials may also reduce further their impact strength properties.

One approach to solving this problem is to apply an elastomeric primer layer of a thermoplastic polymer resin, e.g., a polyurethane, between the plastic substrate and the abrasion resistant coating. The elastomeric layer serves as an energy absorbing layer to prevent cracks that form in the hard coat upon impact from propagating into the plastic substrate. However, a thermoplastic resin lacks a crosslinked structure and can be adversely affected by solvent or monomer-containing overcoats. Consequently, when a plastic material to which a thermoplastic polymer primer layer has been applied is subsequently immersed in or coated with an organic or polysiloxane coating solution, the solvent or monomer therein may dissolve the thermoplastic primer layer and cause it to be eluted in the abrasion resistant coating solution. This has a deleterious affect on the transparency of the abrasion resistant coated article. The thermoplastic primer layer may also lose its transparency or become whitened as a result of being attacked by the solvent.

To avoid these problems, it has been suggested that the primer layer should consist of a thermoset polyurethane in at least one organic solvent, with the polyurethane being formed from a blocked isocyanate which requires the application of heat to disassociate the blocking agent so that the isocyanate group can react with the active hydrogen of the polyol and crosslink. Use of a blocked isocyanate prevents this reaction from taking place at room temperature. However, the addition of a heating step to cure the thermoset polyurethane primer layer before a protective hard coat can be applied over it is expensive, adds undue complexity to the process, and is generally not desirable. Moreover, the solvent(s) may also aggressively attack the plastic substrate.

Accordingly, the need exists for a process to improve the impact resistance of a plastic substrate which does not require the application of a thermoplastic polymer primer layer or heating a solvent-based thermoset polyurethane primer layer to cure it before another coating composition can be applied over it.

SUMMARY OF THE INVENTION

The present invention provides a process for improving the impact resistance of a plastic substrate by applying directly to at least one surface of the substrate a primer layer consisting of an aqueous polyurethane dispersion which can be sufficiently cured by air drying at ambient temperature before another coating layer is applied over it. Unexpectedly and surprisingly, the aqueous polyurethane dispersion cures sufficiently at ambient temperature so as not to require the addition of heat or other radiation to cure it before another coating, such as an abrasion resistant coating composition, can be applied over it without dissolving or otherwise attacking the polyurethane primer layer. Preferably, an organic or siloxane abrasion resistant coating composition can be applied directly over the polyurethane primer layer of the present invention in less than one hour. The combination of the polyurethane primer layer and a protective hard coat provides an impact enhancing, abrasion resistant coating system with strong interfacial adhesion that is preferably transparent for application onto plastic articles such as ophthalmic lenses and safety eye wear.

Preferred aqueous colloidal polyurethane dispersions are anionic stabilized with a pH in the range of about 7 to about 9, a solids content ranging from about 5% to about 40%, and an average particle size in the range of about 10 to about 100 nanometers. Upon air drying at ambient temperature, the aqueous polyurethane dispersion self-crosslinks to form a thermoset, preferably transparent, film which provides a tough, resilient primer layer having strong adhesion to the plastic substrate.

The cured primer layer also imparts strong adhesion to a variety of organic or polysiloxane coating compositions well-known in the art that can be used to form the protective hard coat. Such coating compositions may be thermally cured or cured by radiation to provide a hard coat that is preferably transparent. Particularly preferred coating compositions that are thermally cured include colloidal dispersions of colloidal silica or other water insoluble dispersants in a water-alcohol solution of the partial condensation of silanol. Particularly preferred radiation-curable coating compositions include known acrylate and silane/acrylate-based coatings. Known anti-reflective metal oxide coatings, such as indium tin oxide, may also be applied as a hard outer coat. In addition, the protective hard coat may be selected to provide rapid and deep tintability as is known in the art.

The plastic substrates are preferably transparent and include, but are not limited to, polycarbonates and acrylics, both stretched and cast, particularly CR-39 ® plastic from PPG Industry and high refractive index polymers.

DETAILED DESCRIPTION OF THE INVENTION

The present invention comprises a process for improving the impact resistance of coated plastic substrates and, in particular, transparent coated plastic substrates, by applying a primer layer consisting of an aqueous polyurethane dispersion to at least one surface of the substrate, curing the aqueous polyurethane dispersion by air drying at ambient temperature, applying a coating composition that forms an abrasion resistant coating over the primer layer, and curing the coating composition to form a protective hard coat.

The plastic substrate may be selected from any of the plastic materials suitable for use as a plastic lens in eye glasses or safety goggles, or as a window in buildings or motor vehicles, including airplanes and automobiles. Such materials generally include transparent plastics, including, but not limited to, polycarbonates and acrylics, both stretched and cast. Particularly useful plastic substrates include CR-39 ® plastic, i.e., poly(diethylene glycol bis allyl carbonate) made by PPG Industry; two proprietary plastic materials having high refractive index which are commercially available from Mitsui-Toatsu, a Japanese company, and are known as MR-6 and MR-7 plastics; polyester; cellulose acetate butyrate; and acrylonitrile -butadiene-styrene. Also particularly preferred are plastic lenses made from a polymer obtained by radical-polymerization of a monomer mixture containing an N-substituted phenylmaleimide derivative.

The process of making plastic lenses from such materials is well known in the art. In sum, it comprises (1) casting a monomer mixture into a mold preferably formed from a glass mold and having a gasket made from an ethylene-vinyl acetate copolymer, heating the mold to a predetermined temperature for a predetermined time, removing the resulting plastic material from the glass mold, and then post-curing it at a predetermined temperature for a predetermined period of time to obtain the plastic lens, or (2) injection or compression molding a polymer, e.g., acrylic or polycarbonate polymers, into a lens configuration.

A primer layer consisting of an aqueous polyurethane dispersion is applied directly to at least one surface of the plastic substrate. In general, an aqueous polyurethane dispersion typically is a polyurethane-polyurea, i.e., a polymer characterized by the occurrence of both urethane (—NH—CO—O—) and urea (—NH—CO—NH—) groups in a macromolecular chain. These groups are formed by well-known polyaddition reactions between polyisocyanates and polyols, leading to polyurethane segments, and between polyisocyanates and polyamines, leading to polyurea segments. The selection of particular polyisocyanates, polyols, and polyamines suitable for the production of an aqueous polyurethane dispersion is generally the same as that known from conventional polyurethane chemistry. In particular, however, the isocyanate must exhibit sufficient stability towards water during processing.

Preferably, the urethane polymer of the present invention is formed by condensation of a multi-functional isocyanate with a polyol and an anionic diol, such as dimethylolpropionic acid. When this high molecular weight prepolymer is dispersed in water in the presence of a dispersing agent, particularly a tertiary amine, such as triethanolamine, it forms an anionically stabilized colloidal dispersion. In addition, the aqueous polyurethane dispersion may be blended with anionically stabilized acrylic emulsions. The aqueous polyurethane dispersion preferably has a pH in the range of about 7 to about 9, a solids content ranging from about 5% to about 40%, and an average particle size in the range of about 10 to about 100 nm. Such small particles are preferred so that the cured polyurethane will be transparent; however, in order to form and maintain such small particles, the aqueous polyurethane dispersion must be anionically stabilized. Particularly preferred commercially available aqueous polyurethane dispersions include Witcobond ® W-240, available from the Organics Division of Witco Corporation in Houston, Tex., and NeoRez ® R-9637, available from ICI Resins U.S. in Wilmington, Mass. Because these commercially available aqueous polyurethane dispersions do not separate from a plastic substrate after the coated substrate is boiled in water for three hours, they are particularly suitable for use as primer layers in the process of the present invention when the protective hard coat is tinted using a tinting bath at elevated temperatures as is known in the art.

Preferred isocyanates for forming an aliphatic polyurethane include isophorone diisocyanate, dicyclohexylmethane diisocyanate, e.g., Desmodur W ™, available from Miles Inc. in Pittsburgh, Pa., hexamethylene diisocyanate, and tetramethylxylene diisocyanate. In certain applications where light stability is not required, or where low cost is necessary, aromatic urethanes formed by using toluene diisocyanate or diphenylmethane diisocyanate may be used.

A wide range of commercially available polyols, including linear or slightly branched polyether, polyester, and polycarbonate polyols can be used in forming the polyurethane of the present invention. Particularly preferred polyols include polyether diols and polyester diols. Short chain diols and triols are also used to adjust the urethane group content and polymer branching. Other polyol types, such as epoxy-resins, hydroxy-acrylates, or oil-modified alkyd resins, may be used to impart special properties.

When polyurethane dispersions are formed in an aqueous medium, the isocyanates may also react with the water. Water hydrolyzes isocyanate groups to yield amines and evolve carbon dioxide. Amino groups formed in this manner can then react with the remaining isocyanate groups to form urea linkages which will contribute to the extension of the macro-molecular chain, as well as to the typical properties of an aqueous polyurethane dispersion. However, this isocyanate/water reaction is preferably minimized during the production of high performance polyurethane dispersions because the evolution of $CO_2$ undesireably results in severe foaming. Moreover, aqueous polyurethane dispersions which have been built up predominantly by such "water chain extension" tend to be inferior in polymer performance to those polyurethanes which have been chain extended by polyamines.

The primer layer is formed by coating the plastic substrate with an aqueous polyurethane dispersion, and then allowing the aqueous polyurethane dispersion to air dry at ambient temperature until cured sufficiently to allow another coating composition to be applied over it without dissolving or otherwise attacking the primer layer. By "ambient temperature" is meant about 70° to about 80° F. This curing time will vary depending on the particular aqueous polyurethane dispersion and on environmental air velocity and humidity conditions, but is preferably less than one hour, and most preferably less than about 15 minutes. Particularly preferred aqueous polyurethane dispersions can be cured sufficiently by air drying in less than five minutes. The thickness of the primer layer may range from about 0.05 to about 5 microns, and preferably from about 0.1 to about 2.0 microns. When the thickness is less than about 0.05 microns, the primer layer may not significantly improve the impact resistance of the plastic substrate, while thicknesses greater than about 5 microns tend to unnecessarily increase drying and curing times. The aqueous polyurethane dispersion, upon curing, forms a thermoset polyurethane film that is preferably transparent.

The process of the present invention includes applying at least one other coating composition over the polyurethane primer layer. Such coating compositions preferably form abrasion resistant coatings upon curing, and include organic and polysiloxane coatings well-known in the art that can be thermally cured or cured by radiation. Thermally cured coatings formed by silica-containing mixtures, such as colloidal silica or silica gel, or other water insoluble dispersants, including metals and alloys, salts, oxides and hydroxides thereof, and hydrolyzable silanes in a hydrolysis medium, such as alcohol or water, are particularly preferred. See, for example, U.S. Pat. Nos. 3,986,997, 4,027,073, 4,177,175, 4,177,315, 4,188,451, 4,207,357, 4,218,508, 4,242,381, 4,242,383, 4,242,416, 4,275,118, 4,390,373, 4,442,168, 4,500,669, 4,540,634, 4,571,365, 4,702,773, and 4,753,827, the disclosures of which are hereby incorporated by reference herein. Coating compositions that form an abrasion resistant coating when cured that is tintable are particularly suitable in the process of the present invention. See, for example, U.S. Pat. Nos. 4,355,135, 5,013,608, and 5,102,695, the disclosures of which are hereby incorporated by reference herein. Preferred protective hard coatings that can be cured by ultraviolet light include Chung, U.S. Pat. Nos. 4,348,462, 4,478,876, and 4,486,504, and Revis et al., U.S. Pat. Nos. 4,973,612, 5,075,348, and 5,126,394, the disclosures of which are hereby incorporated by reference herein.

Although the protective hard coat is preferably selected from a siloxane-based curable resin system in view of its greater abrasion resistance, hard coats formed from known organic coatings may also be used where such abrasion resistance is not required. In particular, acrylate-based coatings that are preferably cured by exposure to radiation may also be used, such as those described in Hodnett, III, U.S. Pat. No. 5,114,783, Yoshimara et al., U.S. Pat. No. 4,499,217, and Bilkadi, U.S. Pat. No. 5,104,929, the disclosures of which are hereby incorporated by reference herein.

After the polyurethane primer layer has been covered by a protective coating composition, curing or polymerization of the top coating can be achieved thermally or by irradiation. When the coated substrates are heated by placing them in a curing oven, temperatures in the range of about 50° C. to about 150° C. can be used for most plastic substrates, provided that the time of curing and the temperature do not combine to soften and distort the plastic substrate. Consequently, a temperature of about 80° C. to about 130° C. is preferred for curing the top coating.

When the coatings are cured by irradiation, polymerization may be initiated by any source of ionizing radiation capable of producing free radicals, including infrared, gamma radiation, microwave, and by electron beam or ultraviolet radiation. When polymerization is by ultraviolet radiation, the coating composition will typically include a photoinitiator compound as known in the art for curing UV curable compositions. Ultraviolet light is one of the most widely used types of radiation for curing chemical compositions because of its relatively low cost, ease of maintenance, and low potential hazard to industrial users. Rapid photo-induced polymerizations utilizing ultraviolet light instead of thermal energy for curing hard coatings offer substantial economic benefits, and expend considerably less thermal energy than conventional heat cure systems. Many plastic materials which are particularly heat sensitive can be safely coated and cured with ultraviolet light without the need to use thermal energy which can damage such substrates. Also, radiation cured coatings can utilize lower amounts of solvents, thereby reducing the necessity for expensive and time consuming pollution abatement procedures.

Known inorganic anti-reflective coatings may also be applied over the polyurethane primer layer, or over hard coats covering the primer layer, using deposition techniques well-known in the art, such as vacuum deposition, sputtering, ion plating, etc. Preferred inorganic coatings include metal oxides, such as indium tin oxide.

Each respective coating layer is applied individually to the plastic substrate and at least partially cured prior to the application of the next coating layer. If the primer layer has not been fully cured by air drying at ambient temperature, but only cured sufficiently so that it is not dissolved or otherwise attacked by the coating composition applied over it, then curing the top coat by heat or irradiation will also fully cure the primer layer.

Ordinarily, the coated substrates of the present invention perform best when the thickness of the outermost protective hard coat ranges from about 1 to about 10 microns, preferably from about 3 to about 5 microns, to provide a total coating thickness ranging from about 1.0 to about 15.0 microns, preferably from about 3.0 to about 7.0 microns. Thicknesses within these ranges allow optimum improvement in abrasion resistance without impairing the optical clarity of the coated substrates such as by, e.g., cracking.

Before the primer layer is applied, the plastic substrate is preferably cleaned using techniques known in the art. Both the primer layer and the coating compositions applied over the primer layer can be applied by common coating methods such as dip coating, spraying, brushing, spin coating, roller coating, flow coating, or cascading. The application methods are conventional and may be selected depending upon the nature of the substrate, the desired thickness, and other factors. Dip coating and other coating techniques that coat both sides of a substrate may also be used, or single side coating techniques may be repeated on each side of a substrate if desired. These various methods of coating allow the coating to be placed on at least one surface of the substrate at variable thicknesses, thereby allowing a wider range of uses of the particular coatings.

In order to more fully and clearly describe the present invention so that those skilled in the art may better understand how to practice the present invention, the following examples are given. These are intended to illustrate the invention and should not be construed as limiting the invention disclosed and claimed herein in any manner.

EXAMPLE 1

To show the benefits of the present invention, the process of the present invention was used to coat several different plastic substrates with Witcobond ® W-240, an aqueous polyurethane dispersion, and SIL-VUE ® 339, a colloidal silica filled siloxane coating based on methyltrimethoxysilane and gamma glycidoxypropyl-trimethoxysilane which is commercially available from SDC Coatings Inc. in Anaheim, Calif., and which is made in accordance with the teachings of January, U.S. Pat. No. 4,355,135. The aqueous polyurethane dispersion was applied to each plastic substrate by dip coating, and then allowed to cure by air drying at ambient temperature for 15 minutes, resulting in a primer layer having a thickness of about 2.0 microns. Unexpectedly and surprisingly, when the SILVUE ® 339 coating composition was applied over the primer layer by dip coating, it did not dissolve or otherwise attack the primer layer even though the primer layer had not been heated or subjected to other radiation to cure it, and despite the fact that the SILVUE ® 339 was applied after allowing only 15 minutes for the primer layer to cure by air drying at ambient temperature. The SILVUE ® 339 coating composition was then cured by placing the coated substrate in an oven for 1 hour at a temperature of 120° C., and then allowed to cool to room temperature. The thickness of the cured protective hard coat was about 4.0 microns. An anti-reflective coating was also applied to some of the coated substrates as indicated in the Tables below, using a well-known vacuum deposition process to deposit a metal oxide layer made by Tokai Optical Company, a Japanese company, which it refers to as its super hard, multi-coat anti-reflective coating containing, inter alia, silicon dioxide and magnesium fluoride, on top of the SILVUE 339 ® hard coat. As controls, an uncoated substrate for each of the plastic materials was tested, as were substrates coated only with the SILVUE ® 339 hard coat in the manner described above.

The abrasion resistance of the coated substrates and the controls was measured by a simple hand-rub steel wool test using 10 forward and backward strokes with 0000 steel wool. The substrates were rated "good" if there was a significant reduction in scratching as compared to the uncoated CR-39 ® plastic, and were rated "poor" if there was more scratching in comparison to the uncoated CR-39 plastic. The results of the abrasion resistance tests are set forth in TABLE I below:

TABLE I

| | | Results of Abrasion Resistance Testing (0000 Steel Wool) | | | |
|---|---|---|---|---|---|
| | | ANTI- | Plastic Material | | |
| PRIMER | COATING | REFL. | CR-39 | MR-6 | MR-7 |
| None | None | No | Fair | Poor | Poor |
| None | S-339 | No | Good | Good | Good |
| None | S-339 | Yes | Good | Good | Good |
| W-240 | S-339 | No | Good | Good | Good |
| W-240 | S-339 | Yes | Good | Good | Good |

The impact resistance of the coated substrates and the controls was measured using the American Optical Corporation apparatus described in U.S. Pat. No. 3,896,657. This apparatus utilizes a spherical missile supported by a magnet vertically above the anvil on which a lens is mounted at a fixed distance from the missile. The missile is accelerated using compressed air. The apparatus allows for variable impact energy of the missile against the lens being tested, without altering the size or weight of the missile. The missile is aimed to strike at the center of the lens. Each of the plastic substrates tested, before coating, had a center thickness of 2.0 mm, ±0.1 mm, except for the indicated MR-6 and MR-7 substrates which had a center thickness of 1.1 mm, ±0.1 mm. Energy can be calculated by measuring the weight and velocity of the missile. The velocity of the missile is determined by measuring the time interval between two photosensors. The results of these impact resistance tests are set forth in TABLE II below:

TABLE II

| | | Impact Strength in Joules | | | |
|---|---|---|---|---|---|
| | | ANTI- | Plastic Material | | |
| PRIMER | COATING | REFL. | CR-39 | MR-6 | MR-7 |
| None | None | No | 2.51 | >4.64 | — |
| None | S-339 | No | 0.73 | 0.88 | — |
| None | S-339 | Yes | 0.13 | 0.63 | — |
| W-240 | S-339 | No | 1.23 | 1.36[1] | 1.59[1] |
| W-240 | S-339 | Yes | 1.20 | 3.43[1] | 2.44[1] |

[1]1.1 mm, ± 0.1 mm, Center Thickness

As TABLES I and II show, plastic substrates coated by using the process of the present invention have improved impact resistance over the substrates coated with SILVUE ® 339 without a primer layer, as well as good abrasion resistance. The impact strength of each of the coated substrates made by the process of the present invention greatly exceeds the minimum FDA requirement of 0.2 joules. The coated substrates also have very good adhesion between the substrate and the primer layer, and between the primer layer and the hard coat. Thus, the coated substrates made by the process of the present invention are particularly useful as plastic lenses for eyeglasses and safety goggles, and as windows in buildings and in motor vehicles.

Other modifications and variations of the present invention are possible in light of the above teachings. For example, additives and other modifying agents may be added to the primer layer or to the abrasion resistant coating compositions, and additional coating compositions can be applied to the coated substrate of this invention. It is to be understood, however, that changes may be made in the particular embodiments described above which are within the full intended scope of the invention as defined in the appended claims.

What is claimed is:

1. A process for improving the impact resistance of a plastic substrate, comprising:
    applying an aqueous polyurethane dispersion having a pH in the range of about 7 to about 9, a solids content in the range of about 5% to about 40%, and a particle size in the range of about 10 to about 100 nanometers, to at least one surface of the plastic substrate, wherein the polyurethane is formed by condensation of a multi-functional isocyanate with an anionic diol and a polyol selected from the groups consisting of polyether diols and polyester diols;
    at least partially curing the aqueous polyurethane dispersion by air drying at ambient temperature to form a primer layer;
    applying an abrasion resistant coating composition over the polyurethane primer layer, wherein the abrasion resistant coating composition consists of a silicon-based resin or an acrylic-based resin; and
    curing the abrasion resistant coating composition to form a protective abrasion resistant hard coat.

2. The process of claim 1 wherein the substrate is a polycarbonate plastic.

3. The process of claim 1 wherein the substrate is an acrylic plastic.

4. The process of claim 1 wherein the substrate is a plastic material having a high refractive index.

5. The process of claim 1 wherein the plastic substrate is formed from a polymer obtained by radical polymerization of a monomer mixture containing an N-substituted phenylmaleimide derivative.

6. The process of claim 1 wherein the plastic substrate is an ophthalmic lens.

7. The process of claim 1 wherein the step of at least partially curing the aqueous polyurethane dispersion includes air drying the polyurethane dispersion at ambient temperature for less than one hour prior to the application of the abrasion resistant coating composition.

8. The process of claim 1 wherein the anionic diol is dimethylolpropionic acid.

9. The process of claim 1 wherein the aqueous polyurethane dispersion includes triethanolamine as a dispersing agent.

10. The process of claim 1 wherein the primer layer has a thickness of from about 0.1 to about 2 microns.

11. The process of claim 1 wherein the substrate, the primer layer and the abrasion resistant hard coat are transparent.

12. The process of claim 1 wherein the abrasion resistant top coat has a thickness of from about 1 to about 10 microns.

13. The process of claim 1 wherein the total coating thickness ranges from about 1.0 microns to about 15.0 microns.

14. The process of claim 1 further comprising the step of:
    applying an inorganic anti-reflective coating over the abrasion resistant hard coat.

15. A process for improving the impact resistance of a transparent plastic substrate used as an ophthalmic lens, comprising:
    applying an aqueous polyurethane dispersion having a pH in the range of about 7 to about 9, a solids content in the range of about 5% to about 40%, and a particle size in the range of about 10 to about 100 nanometers, to at least one surface of the plastic substrate, wherein the polyurethane is formed by condensation of a multi-functional isocyanate with an anionic diol and a polyol selected from the group consisting of polyether diols and polyester diols;
    at least partially curing the aqueous polyurethane dispersion by air drying at ambient temperature for less than one hour to form a transparent primer layer;
    applying an abrasion resistant coating composition over the polyurethane primer layer, wherein the abrasion resistant coating composition consists of a silicon-based resin or an acrylic-based resin; and
    curing the abrasion resistant coating composition to form a transparent, protective abrasion resistant hard coat.

16. The process of claim 15 wherein the anionic diol is dimethylolpropionic acid.

17. The process of claim 15 wherein the aqueous polyurethane dispersion includes triethanolamine as a dispersing agent.

18. The process of claim 15 wherein the substrate is a polycarbonate plastic.

19. The process of claim 15 wherein the substrate is an acrylic plastic.

20. The process of claim 15 wherein the substrate is a plastic material having a high refractive index.

21. The process of claim 15 wherein the substrate is formed from a polymer obtained by radical polymerization of a monomer mixture containing an N-substituted phenylmaleimide derivative.

22. The process of claim 15 wherein the primer layer has a thickness of from about 0.1 to about 2 microns.

23. The process of claim 15 wherein the abrasion resistant top coat has a thickness of from about 1 to about 10 microns.

24. The process of claim 18 wherein the total coating thickness ranges from about 1.0 to about 15.0 microns.

25. The process of claim 15 further comprising the step of:
    applying an inorganic anti-reflective coating over the abrasion resistant hard coat.

* * * * *